United States Patent
Dutsky et al.

(10) Patent No.: US 10,160,483 B2
(45) Date of Patent: Dec. 25, 2018

(54) RETAINER ASSEMBLY FOR POWER STEERING SYSTEM

(71) Applicant: STEERING SOLUTIONS IP HOLDING CORPORATION, Saginaw, MI (US)

(72) Inventors: Jason A. Dutsky, Bay City, MI (US); Sheri L. Bachynski, Birch Run, MI (US); John W. Kalmar, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 917 days.

(21) Appl. No.: 14/525,609

(22) Filed: Oct. 28, 2014

(65) Prior Publication Data

US 2015/0114749 A1    Apr. 30, 2015

Related U.S. Application Data

(60) Provisional application No. 61/896,762, filed on Oct. 29, 2013.

(51) Int. Cl.
| | |
|---|---|
| B62D 5/06 | (2006.01) |
| B62D 65/00 | (2006.01) |
| F16D 27/14 | (2006.01) |
| H01F 7/02 | (2006.01) |
| B62D 5/083 | (2006.01) |
| H01F 7/14 | (2006.01) |

(52) U.S. Cl.
CPC .......... B62D 5/062 (2013.01); B62D 5/0835 (2013.01); B62D 65/00 (2013.01); F16D 27/14 (2013.01); H01F 7/0221 (2013.01); H01F 7/14 (2013.01); Y10T 29/49 (2015.01); Y10T 29/49826 (2015.01)

(58) Field of Classification Search
CPC ....... B62D 5/062; B62D 5/0836; F16D 27/14; H01F 7/0221; H01F 7/14
USPC ......................................................... 180/417
See application file for complete search history.

(56) References Cited

U.S. PATENT DOCUMENTS

| | | | |
|---|---|---|---|
| 5,119,898 A | 6/1992 | Eckhardt et al. | |
| 5,749,432 A | 5/1998 | Birsching | |
| 7,434,654 B2 | 10/2008 | Birsching et al. | |
| 7,898,139 B2 | 3/2011 | Islam et al. | |

(Continued)

FOREIGN PATENT DOCUMENTS

| | | |
|---|---|---|
| CN | 1857955 A | 11/2006 |
| CN | 101420164 A | 4/2009 |

(Continued)

OTHER PUBLICATIONS

English Translation of Chinese Office Action and Search Report for Chinese Application No. 201410856353.1 dated Feb. 13, 2017, 6 pages.

(Continued)

*Primary Examiner* — Joseph M Rocca
*Assistant Examiner* — Conan D Duda
(74) *Attorney, Agent, or Firm* — Cantor Colburn LLP

(57) ABSTRACT

In one aspect of the invention, a retainer assembly for a power steering assist system is provided. The retainer assembly includes a retainer having an inner wall defining an opening, at least one permanent magnet coupled to the retainer, and at least one spiral channel formed in the inner wall.

11 Claims, 3 Drawing Sheets

(56) References Cited

U.S. PATENT DOCUMENTS

| | | | |
|---|---|---|---|
| 8,170,751 B2 | 5/2012 | Lee et al. | |
| 2003/0000765 A1* | 1/2003 | Spadafora | B62D 5/062 180/422 |
| 2003/0019686 A1* | 1/2003 | Fukuda | B62D 5/0427 180/444 |
| 2006/0249326 A1 | 11/2006 | Birsching et al. | |
| 2007/0107975 A1* | 5/2007 | Onishi | B62D 5/0403 180/444 |
| 2008/0121058 A1* | 5/2008 | Fujita | B62D 5/0448 74/424.87 |
| 2009/0050398 A1 | 2/2009 | Islam et al. | |
| 2009/0312145 A1* | 12/2009 | Pohl | F02B 67/04 477/37 |
| 2010/0045227 A1* | 2/2010 | Ura | G01D 5/24461 318/490 |
| 2010/0089686 A1* | 4/2010 | Khetan | B62D 5/0835 180/417 |
| 2010/0200326 A1* | 8/2010 | Asakura | B62D 5/0427 180/444 |
| 2010/0205952 A1* | 8/2010 | Yamamuro | B62D 5/062 60/445 |
| 2010/0206656 A1* | 8/2010 | Asakura | F16H 25/2214 180/444 |
| 2011/0048838 A1* | 3/2011 | Asakura | B62D 5/0427 180/444 |
| 2011/0048839 A1* | 3/2011 | Asakura | B62D 5/0427 180/444 |
| 2011/0296939 A1* | 12/2011 | Kaneko | F16H 25/2214 74/424.87 |
| 2013/0081899 A1* | 4/2013 | Asakura | B62D 5/0427 180/444 |
| 2013/0118827 A1* | 5/2013 | Imanishi | B62D 5/0409 180/443 |
| 2013/0233103 A1* | 9/2013 | Asakura | B62D 5/0448 74/89.23 |
| 2013/0239714 A1* | 9/2013 | Yamanaka | B62D 5/001 74/89.34 |
| 2013/0292201 A1* | 11/2013 | Yamanaka | B62D 5/0427 180/402 |
| 2014/0096634 A1* | 4/2014 | Motoyama | F16H 25/2214 74/424.86 |
| 2017/0106901 A1* | 4/2017 | Gong | B62D 5/062 |
| 2017/0166249 A1* | 6/2017 | Birsching | B62D 5/065 |

FOREIGN PATENT DOCUMENTS

| | | |
|---|---|---|
| CN | 102501896 A | 6/2012 |
| EP | 2221237 A1 | 8/2010 |
| JP | 2010106899 A | 5/2010 |

OTHER PUBLICATIONS

English Translation of Chinese Office Action and Search Report for Chinese Application No. 201410856353.1 dated Jul. 1, 2016, 6 pages.

* cited by examiner

RETAINER ASSEMBLY FOR POWER STEERING SYSTEM

CROSS-REFERENCES TO RELATED APPLICATIONS

This patent application claims priority to U.S. Provisional Patent Application Ser. No. 61/896,762, filed Oct. 29, 2013, which is incorporated herein by reference in its entirety.

FIELD OF THE INVENTION

The following description relates to a vehicle steering assist system, and more particularly, to a magnet retainer coupling for a hydraulic steering assist system.

BACKGROUND OF THE INVENTION

In some vehicles, power steering systems are designed to provide hydraulic assist to enable a driver to complete a turn of the vehicle. For example, the driver applies a steering input through a steering wheel that is rotationally connected to a first shaft. The first shaft is rotationally coupled to a second shaft that is, in turn, connected to a steering mechanism. The first and second shafts are torque transmittingly coupled together by a compliant member, such as a torsion bar, which enables the first shaft to rotate with respect to the second shaft.

Some known hydraulic steering systems use a recirculating ball style steering gear or a rack and pinion style steering gear, each of which may not have the capability to perform functions such as park assist, lane keeping, lead and pull compensation, drive alert, active return-to-center, active dampening, or stability control assist. Typically, in order to provide such additional performance features, a system such as a hydraulic variable effort steering system, for example, is required. The system may include a magnet retainer coupled to a shaft. However, in some systems, the retainer may separate from the shaft resulting in a pulling or binding feel to a driver. Accordingly, it is desirable to provide an improved coupling between the magnet retainer and the shaft.

SUMMARY OF THE INVENTION

In one aspect of the invention, a retainer assembly for a power steering assist system is provided. The retainer assembly includes a retainer having an inner wall defining an opening, at least one permanent magnet coupled to the retainer, and at least one spiral channel formed in the inner wall.

In another aspect of the invention, a power steering assist system is provided. The system includes a housing, a rotary valve assembly, a differential pressure transducer, and a magnetic actuator assembly. The magnetic actuator assembly includes a retainer having an inner wall defining an opening, at least one permanent magnet coupled to the retainer, at least one spiral channel formed in the inner wall, a shaft disposed through the opening, and a joint coupled between the shaft and the retainer. At least a portion of the joint is disposed within the at least one spiral channel.

In yet another aspect of the invention, a method of fabricating a retainer assembly for a power steering assist system is provided. The method includes forming a retainer having an inner wall defining an opening, and forming at least one spiral channel in the inner wall.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
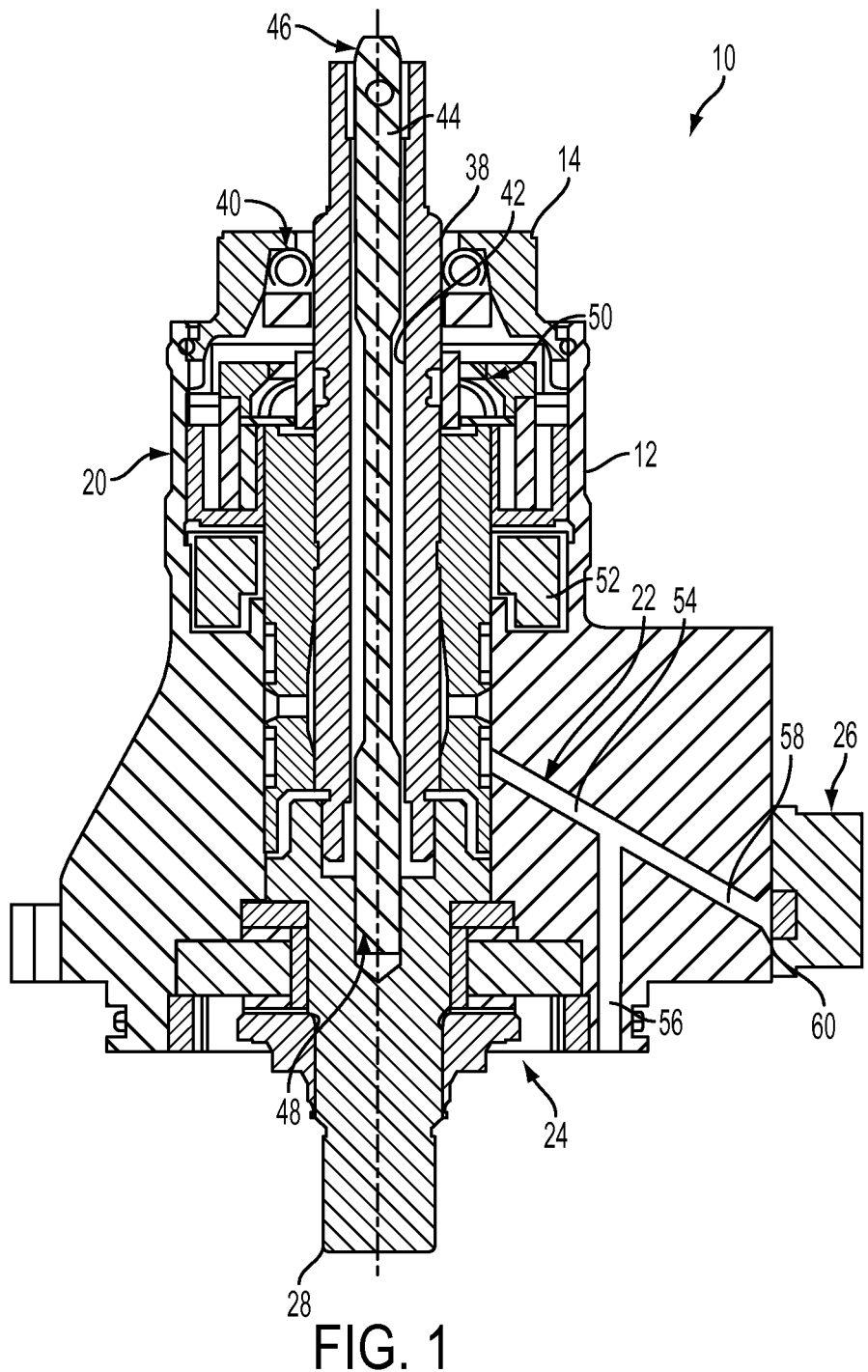
FIG. 1 is a cross-sectional view of an exemplary hydraulic assist power steering system.

Referring now to the Figures, where the invention will be described with reference to specific embodiments, without limiting same, an exemplary embodiment of an electronic hydraulic-assist power-steering system 10 for a vehicle is illustrated in FIG. 1. System 10 generally includes a valve housing 12 and associated cover 14 that generally house a magnetic actuator assembly 20, a hydraulic rotary valve assembly 22, a bearing assembly 24, a differential pressure transmitter or transducer 26, and a steering gear coupler 28.

In the exemplary embodiment, system 10 includes an input shaft 38 rotatably supported by a bearing 40. Input shaft 38 includes a bore 42 to receive a torsion bar 44 having a first end 46 and a second end 48. Torsion bar first end 46 is coupled to a steering wheel (not shown) of a vehicle for rotation in a conventional manner, and second end 48 is coupled to coupler 28, which is configured for coupling to an existing steering gear (not shown).

Magnetic actuator assembly 20 includes a permanent magnet retainer assembly 50, which is coupled to shaft 38, and a coil 52 to produce a magnetic flux. The magnetic flux causes retainer assembly 50 to rotate and produce a torque on shaft 38, which varies the effective centering torque of torsion bar 44 to change the level of steering assist (i.e., steering assist boost pressure), achieved for a given manual steering input applied at the steering wheel of the vehicle.

In the exemplary embodiment, hydraulic rotary valve assembly 22 is configured to provide hydraulic assistance to the steering operation of the vehicle. Hydraulic rotary valve assembly 22 includes ports 54, 56, and 58, and a seal 60.

In the exemplary embodiment, bearing assembly 24 is configured to support rotational movement of steering gear coupler 28. Alternatively, shaft 38 and coupler 28 may be a single shaft rotatably supported by bearing assembly 24.

In the exemplary embodiment, differential pressure transducer 26 is coupled to housing 12 proximate hydraulic rotary valve assembly 22. Differential pressure transducer 26 converts pressure into an electrical signal. One exemplary type of pressure transducer is a strain-gage based transducer, where the conversion of pressure into an electrical signal is achieved by the physical deformation of a strain gage or gages bonded into the diaphragm of the pressure transducer. The diaphragm may help protect the sensor element, such as the strain gage, from the fluid that is being measured. A strain gage is a resistive element whose resistance changes with the amount of strain placed on it. Pressure applied to the transducer may produce a deflection of the diaphragm that introduces strain to the gages, which produces an electrical resistance change proportional to the pressure.

Figure 2:
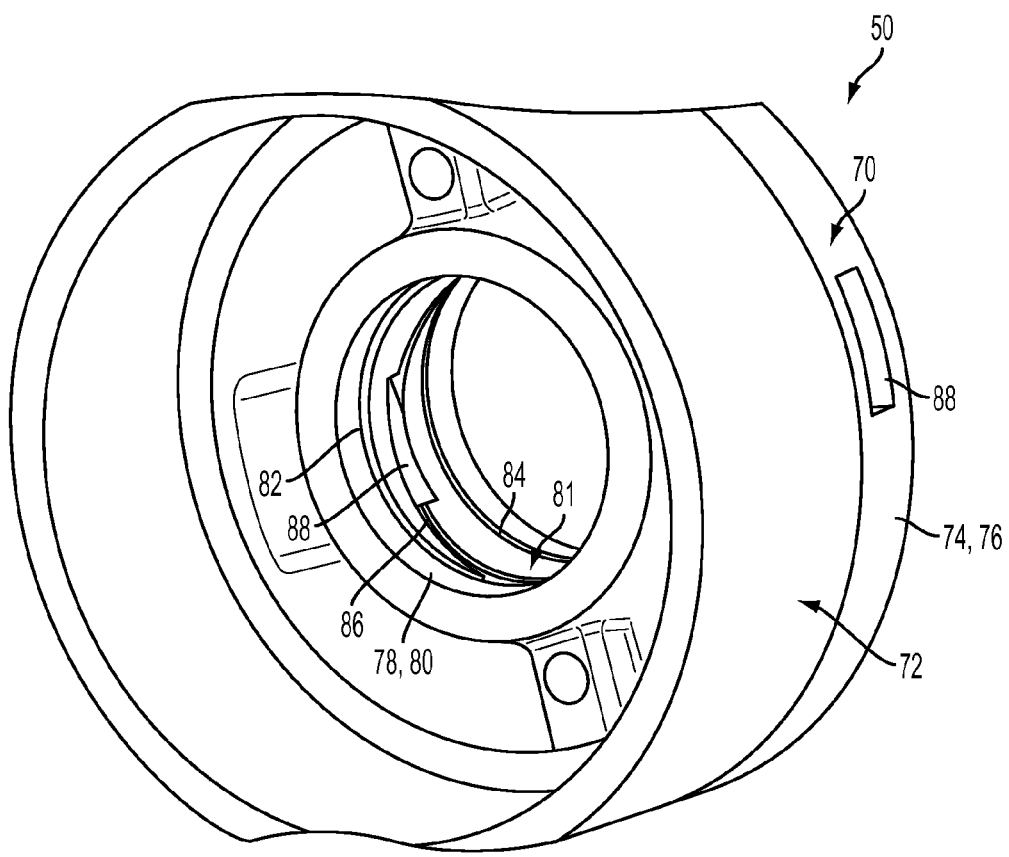
FIG. 2 is perspective view of an exemplary magnet retainer assembly that may be used with the system shown in FIG. 1.
Figure 3:
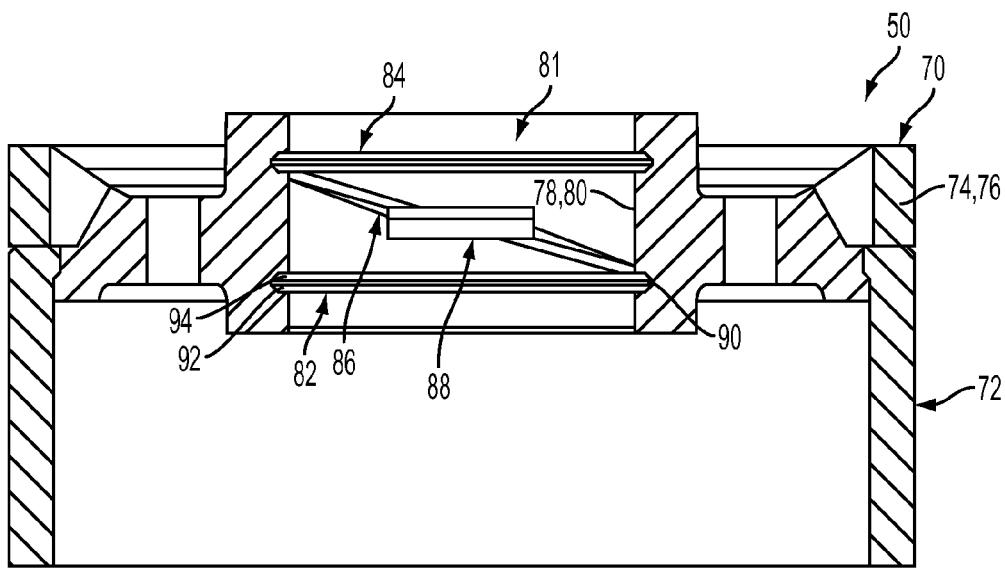
FIG. 3 is a cross-sectional view of the magnet retainer assembly taken along line 3-3 in FIG. 2.
Figure 4:
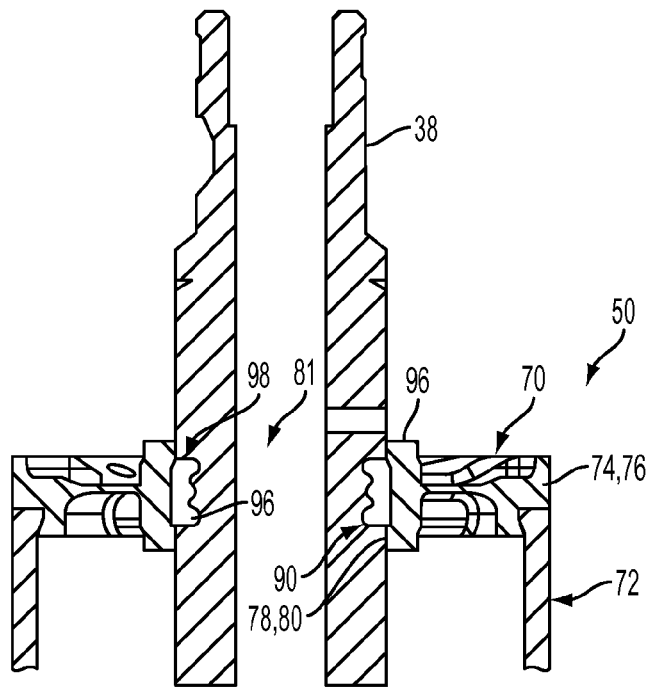
FIG. 4 is a cross-sectional view of the magnet retainer assembly shown in FIG. 2 coupled to an exemplary spool shaft.

With reference to FIGS. 2-4, in the exemplary embodiment, magnet retainer assembly 50 generally includes a retainer 70 coupled to one or more permanent magnets 72. In one embodiment, retainer 70 is over-molded onto permanent magnets 72. However, permanent magnets 72 may be coupled to retainer 70 in any suitable manner.

Retainer 70 is circular or substantially circular and includes an outer wall 74 defining an outer diameter 76 and an inner wall 78 defining an inner diameter 80. Inner wall 78 defines an opening 81 (FIGS. 2 and 3) to receive shaft 38 therethrough (FIG. 4). In the exemplary embodiment, inner wall 78 includes a first recess or channel 82, a second recess or channel 84, a spiral-like (e.g., helical) recess or channel 86, and at least one injection port 88 formed therein. As illustrated in FIG. 3, channels 82, 84, and spiral channel 86 each include a central portion 90 that is disposed between and formed deeper than opposed outer portions 92 and 94. As such, channels 82, 84 and spiral channel 86 define a tiered configuration that facilitates multiple interferences between retainer 70 and a material disposed within channels 82, 84, 86. However, channels 82, 84, and 86 may be formed with any suitable shape or number of tiers that enables retainer 70 to function as described herein.

As shown in FIG. 4, shaft 38 is inserted into retainer opening 81. A material is then injected into injection port 88 to form a connector or joint 96 that couples retainer 70 to shaft 38. During the injection process, the injection molded material flows through injection port 88 and into channels 82, 84, 86, as well as a recess 98 formed in shaft 38. As such, once the injected material is disposed therein, channels 82, 84 facilitate preventing axial movement between retainer 70 and shaft 38, and spiral channel 86 facilitates preventing radial and axial movement between retainer 70 and shaft 38. In particular, spiral channel 86 produces plastic inject contact lines that are not parallel or perpendicular to any surface on retainer 70 and shaft 38. When natural shrinkage of joint 96 occurs, the material tightens around spiral 86, which facilitates preventing looseness between retainer 70 and shaft 38 that could reduce performance of system 10.

Figure 5:
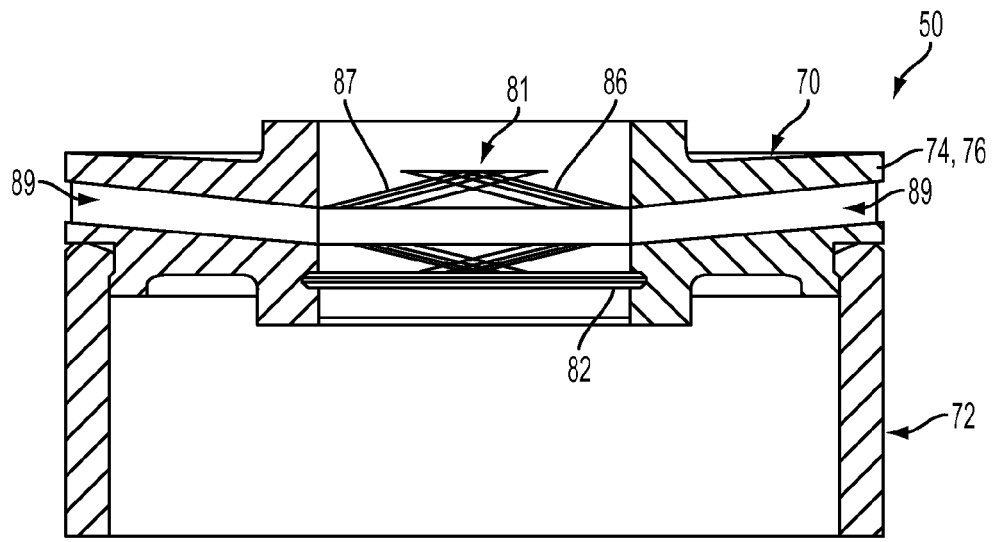
FIG. 5 is another exemplary magnet retainer assembly that may be used with the system shown in FIG. 1.

FIG. 5 illustrates an alternative embodiment of magnet retainer assembly in which inner wall 78 includes a first spiral channel 86, a second spiral channel 87, and injection ports 89. As shown, spiral channels 86 and 87 are wound or disposed at opposite angles and may intersect in at least one location.

A method of assembling system 10 includes providing shaft 38, retainer 70, and one or more permanent magnets 72. Retainer 70 is coupled to magnet(s) 72 and at least one spiral channel 86, 87 is formed in inner wall 78 of retainer 70. One or more channel 82, 84 may also be formed in retainer inner wall 78. Shaft 38 is inserted into retainer opening 81, and a material is injected into port(s) 88, 89 between retainer 70 and shaft 38 to form joint 96. In one embodiment, the injected material is a glass filled polypropylene sulfide (PPS). However, the material may be any suitable injected material such as, for example, high performance thermoplastic polymer.

Described herein are systems and methods providing an improved connection between a magnet retainer and a shaft in a hydraulic-assist power steering system. The magnet retainer includes an inner wall having a one or more circumferential/spiral channels formed therein. A material is injected into the channels between the magnet retainer and the shaft to form a joint or coupling therebetween. The channels are shaped such that the injected material disposed therein facilitates axial retention and/or radial retention of the magnet retainer relative to the shaft. As such, the coupling is less sensitive to the temperature and pressure of the injection, provides low and consistent lash results, and provides higher axial and radial ultimate strengths at both room temperatures and higher temperatures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A retainer assembly for a power steering assist system, the retainer assembly comprising:
   a retainer having an outer wall and an inner wall defining an opening;
   at least one permanent magnet coupled to and abutting the outer wall;
   a first spiral channel formed in the inner wall;
   a second spiral channel formed in the inner wall;
   wherein the first spiral channel and the second spiral channel are oriented at opposite angles with respect to one another and the first spiral channel and the second spiral channel intersect with one another.

2. The retainer assembly of claim 1, further comprising at least one injection port formed in the inner wall.

3. A power steering assist system comprising:
   a housing;
   a rotary valve assembly;
   a differential pressure transducer; and
   a magnetic actuator assembly comprising:
      a retainer having an inner wall defining an opening;
      at least one permanent magnet coupled to the retainer;
      at least one spiral channel formed in the inner wall;
      a shaft disposed through the opening; and
      a joint coupled between the shaft and the retainer, wherein at least a portion of the joint is disposed within the at least one spiral channel.

4. The system of claim 3, wherein the shaft is an input shaft disposed at least partially within the housing, the input shaft having a bore, a first end configured to couple to a vehicle steering wheel, and a second end configured to couple to a steering gear, the system further comprising a torsion bar disposed within the input shaft bore.

5. The system of claim 4, wherein the torsion bar includes a first end and a second end, wherein the first end is configured to couple the shaft first end to the vehicle steering wheel.

6. The retainer assembly of claim 3, further comprising at least one second channel formed in the inner wall.

7. The retainer assembly of claim 6, wherein the at least one spiral channel and the at least one second channel intersect.

8. The retainer assembly of claim 3, wherein the at least one spiral channel comprises a first spiral channel and a second spiral channel.

9. The retainer assembly of claim 8, wherein the first spiral channel and the second spiral channel are oriented at opposite angles.

10. The retainer assembly of claim 9, wherein the first spiral channel intersects the second spiral channel.

11. The retainer assembly of claim 3, further comprising at least one injection port formed in the inner wall.

* * * * *